Sept. 2, 1952  J. A. McNALLY  2,609,168
JET AIRFOIL BRAKE
Filed Sept. 10, 1947  3 Sheets-Sheet 1

Inventor
JAMES A. MC NALLY

By M. O. Hayes
Attorney

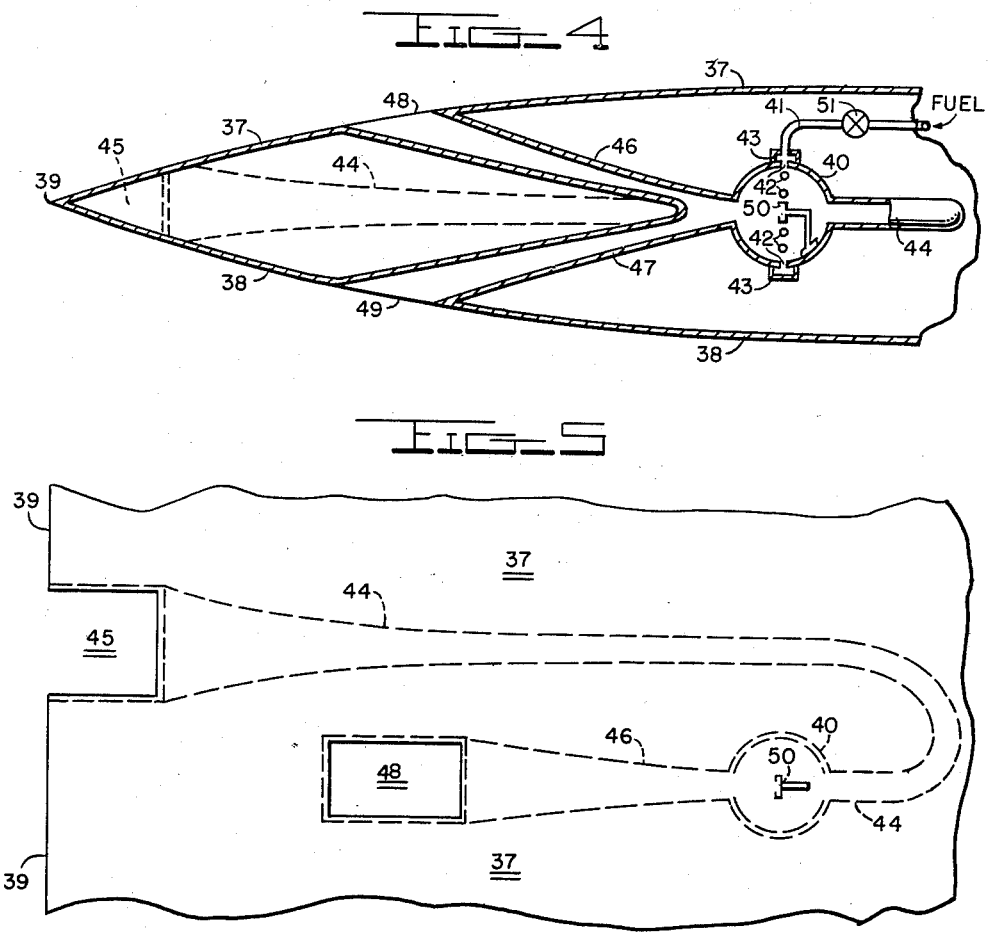

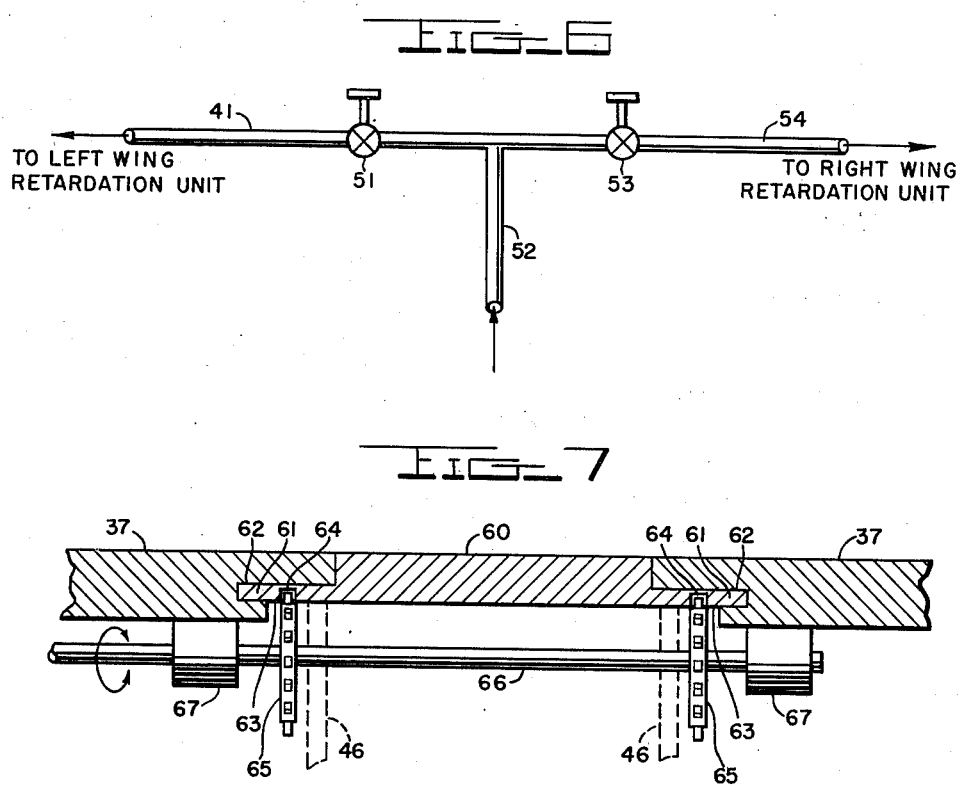

Patented Sept. 2, 1952

2,609,168

UNITED STATES PATENT OFFICE 2,609,168

JET AIRFOIL BRAKE

James A. McNally, United States Navy

Application September 10, 1947, Serial No. 773,282

1 Claim. (Cl. 244—113)

(Granted under the act of March 3, 1883, as amended April 30, 1928; 370 O. G. 757)

This invention relates to aircraft and more particularly to means for retarding the forward motion of aircraft while in flight.

Means for retarding the forward motion of aircraft while in flight as provided by the prior art includes spoiler devices such as conventional wing flaps, which are extended, from a position coincident with the contour of the airfoil section into the slip stream to vary the aerodynamic characteristics of the section. Such spoiler devices operate satisfactorily for retarding the forward motion of aircraft flying at low velocities but do not provide adequate retarding means when employed in connection wtth aircraft moving at relatively high velocities, within the supersonic range for example, and furthermore, forces encountered at such high velocities render the use of conventional spoiler devices impracticable.

It is therefore an object of the present invention to provide novel means for retarding the forward motion of an airfoil section while in flight.

Another object is to provide novel means for retarding the forward motion of an aircraft while in flight at extremely high velocities, within the supersonic range for example.

Another object is to provide novel means for retarding the forward motion of an airfoil section while in flight without substantially varying the aerodynamic characteristics thereof.

Another object is to provide means for discharging a source of hot motive fluid from an airfoil section in the direction of forward motion thereof.

Still another object of the present invention is to provide novel means utilized in connection with an airfoil section, for producing a reactive force applied to the section in opposition to the direction of forward motion thereof.

Still another object is to provide an airfoil section including jet propulsion means, with the jet propulsion means mounted in the section in such a manner as to apply a force thereto in opposition to the direction of forward motion thereof.

Still another object is to provide an aircraft including novel means applying a force thereto directed in opposition to the forward motion thereof, with the means mounted in the wings of the aircraft and so characterized to selectively apply forces thereto for providing directive control of the aircraft.

A still further object of the present invention is to provide novel means for retarding the forward motion of an airfoil section while in flight including means for discharging a source of hot motor fluid from the section substantially into the direction of forward motion thereof, with the discharge means comprising a plurality of discharge device mounted in the section in such a manner as to render the airfoil section readily controllable during periods of retardation.

Other objects and features of the present invention will appear more fully hereinafter from the following detailed description when considered in connection with the accompanying drawings which disclosed several embodiments of the invention. It is to be expressly understood, however, that the drawings are designed for purposes of illustration only and are not to be considered as a definition of the limits of the invention, reference of the latter purpose being had to the appended claim.

In the drawings, wherein similar reference characters denote similar elements with several views:

Fig. 4 is a diagrammatic illustration, in section, of an airfoil section constructed in accordance with the principles of still another embodiment of the present invention;

Fig. 5 is a plan view of the airfoil section disclosed in Fig. 4;

Fig. 6 is a diagrammatic illustration of another feature of the present invention, and Fig. 7 is a sectional illustration of still another feature of the present invention.

Figure 1:
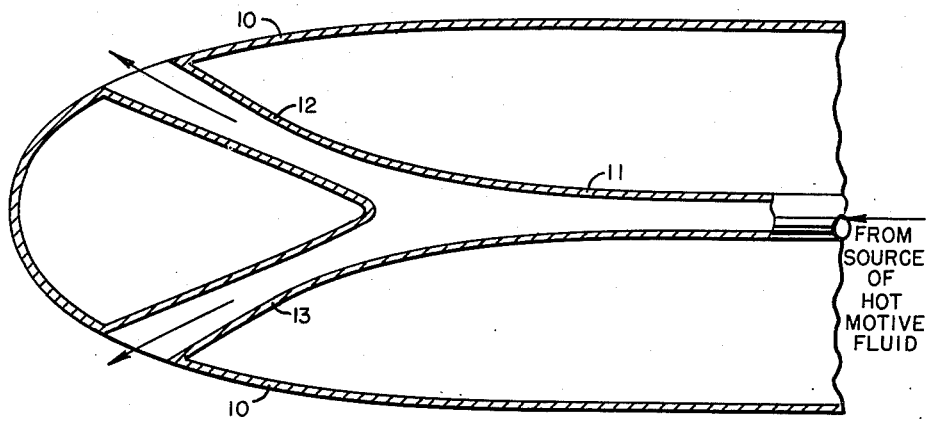
Fig. 1 is a diagrammatic illustration, in section, of an airfoil section embodying the principles of the present invention.

With reference more particularly to Fig. 1 of the drawings, novel means, constructed in accordance with the principles of the present invention, for retarding forward motion of the airfoil section while in flight, is disclosed therein in connection with an airfoil section 10 adapted to move through the atmosphere, or through other suitable supporting mediums in a direction to the left, as viewed in the drawing, at high velocities upon operation of suitable propulsion means, as shown. The airfoil section 10 is disclosed substantially in the form of the forward end of an aircraft fuselage, however, it is to be expressly understood for the purposes of the present invention, that the airfoil section 10 may take the form of a wing section of an aircraft, or may comprise a nacelle associated with an aircraft. The airfoil section 10 is provided with a supply conduit 11 connected to a source of hot motor fluid. The source of hot motor fluid may be derived from the output of a jet propulsion motor utilized for supplying propulsion forces to the airfoil section, or from a generator specifically provided for providing hot motive fluid utilized by the present invention. The conduit 11 extends toward the forward end of the airfoil section 10 and terminates in fluid connection with discharge nozzles 12 and 13. The discharge nozzles 12 and 13 extend from the conduit 11, in angular relationship, toward the forward end of the section 10, and terminate in fluid openings in the wall thereof.

When the conduit 11 is energized with hot motive fluid, while the airfoil section 10 is in motion, energy is derived from the hot motor fluid discharged through the nozzles 12 and 13 to apply forces to the airfoil section in opposition to the forward motion thereof. Since the discharge nozzles 12 and 13 are angularly disposed with respect to the longitudinal axis of the section 10, the direction of motion of the section is readily controlled during the period when the nozzles 12 and 13 are energized. It is to be expressly understood that the number of discharge nozzles, the capacities thereof, the capacity of the input nozzle 11, and the pressure, temperature and rate of flow of the source of hot motor fluid are selected to provide the desired degree of retardation.

Figure 2:
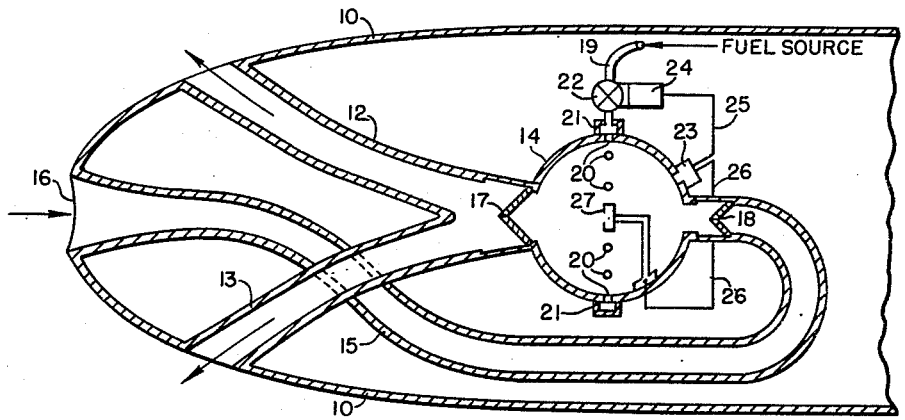
Fig. 2 is a diagrammatic sectional illustration of an airfoil section constructed in accordance with another embodiment of the present invention.

The embodiment of the invention disclosed in Fig. 2 of the drawings includes self-contained means for applying a retarding force to the airfoil section 10 in opposition to the forward motion thereof. As shown, a spherical combustion chamber 14 is positioned within the forward end of the section 10 with the discharge nozzles 12 and 13 communicating with the output port thereof. Fluid under pressure, such as air derived from the atmosphere through which the section 10 moves, is applied to the combustion chamber 14 through conduit 15. Conduit 15 extends from an opening 16, in the forward end of the section 10, to the input port of the combustion chamber 14. Pressure responsive valvular means 17 and 18 are respectively positioned in the output and input ports of the combustion chamber 14 for controlling the fluid flow therethrough as will apepar more fully hereinafter. Fuel under pressure from conduit 19 is injected into the combustion chamber 14 through a plurality of nozzles 20 located in a common plane throughout the inner periphery of the chamber 14. The nozzles 20 are supplied with fuel from the conduit 19 through annular fuel manifold 21, positioned about the outer periphery of the combustion chamber 14, and through a valvular mechanism 22. The mechanism 22 operates automatically in response to a predetermined pressure within the combustion chamber 14 to form a fuel connection between the conduit 19 and the manifold 21. As shown, transmitter means 23 operates when a predetermined pressure exists within the chamber 14 to energize electromagnetic control device 24, through conductor 25, thereby moving the valvular mechanism 22 into a position to allow fluid communication therethrough. The transmitter 23 also functions, by way of conductor 26, to control energization of fuel igniting device 27.

Figure 3:
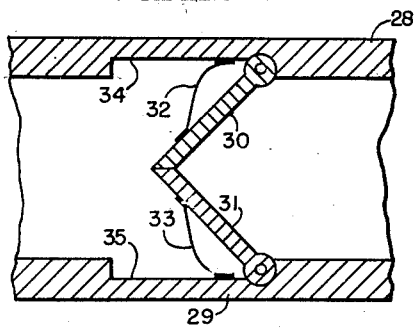
Fig. 3 is a sectional illustration showing certain elements of the apparatus disclosed in Fig. 2 in greater detail.

The valvular means 17 and 18 function to allow accumulation of fluid under sufficient pressure within the chamber 14 to operate the transmitter device 23, and to allow the hot motor fluid to discharge therefrom through the nozzles 12 and 13. Construction of the valvular means 17 and 18 is shown in greater detail in Fig. 3 wherein a section of the input or output port of the combustion chamber 14 is disclosed including wall members 28 and 29. Valve members 30 and 31 are pivotably secured to wall members 28 and 29, respectively, and are normally urged into closed position shown through the action of spring devices 32 and 33. When fluid under sufficient pressure exists on the input side of the valve members 30 and 31 to overcome the fluid pressure on the left side of the valve members, as viewed in the drawing, and the action of spring devices 32 and 33, the valve members 30 and 31 move into recesses of 34 and 35 provided therefore in respective wall sections 28 and 29.

In operation of the embodiment disclosed Fig. 2, fluid under pressure, due to the forward motion of the airfoil section 10, is applied through conduit 15 to the input side of the valvular means 18, and to the output side of the valvular means 17 through exhaust nozzles 12 and 13. The applied pressure moves the valvular means 18 to open position and maintains the valvular means 17 in closed position to allow fluid under pressure to enter and accumulate within the chamber 14. The area of valve members 30 and 31 of the valvular means 17, and the tension of the spring devices 32 and 33 associated therewith, are selected so that the fluid pressure accumulating within the chamber 14 attains a predetermined value to operate transmitter device 23 before the valvular means 17 moves to open position. When fluid within the combustion chamber 14 builds up to the predetermined value to operate the transmitter device 23, fuel is injected into the chamber 14 to form a combustible mixture which is ignited upon operation of the igniting device 27. When ignition occurs, a source of hot motor fluid is generated. The resulting high pressures urge the valvular means 18 to closed position and move the valvular means 17 to open position allowing the hot motor fluid from the chamber 14 to discharge through the nozzles 12 and 13 thereby applying forces to the airfoil section 10 in opposition to the direction of forward motion thereof. When the pressure within the chamber 14 drops below the fluid pressure in the conduit 15, the foregoing cycle is repeated.

Another embodiment of the invention is shown in Figs. 4 and 5. In this embodiment the airfoil section is disclosed in the form of a high speed aircraft wing including upper surface 37, lower surface 38 and leading edge 39. The retarding means includes a spherical combustion chamber 40 and means for continually supplying the chamber 40 with fuel under pressure. As shown, a conduit 41 supplies fuel from a fuel source, not shown, to the chamber 40, through a plurality of discharge nozzles 42 by way of annular fuel manifold 43. Fluid under high pressure is continually supplied to the input port of combustion chamber 40 through conduit 44. As shown more clearly in Fig. 5, the conduit 44 extends from the input port of the chamber 40 to an opening 45 in the leading edge 39 including a portion of the surfaces 37 and 38. The output port of the combustion chamber 40 communicates with a pair of angularly disposed exhaust nozzles 46 and 47 which terminate in openings 48 and 49 in the upper and lower surfaces 38 and 39, respectively. A suitable igniting means 50 is provided within the chamber 40. The igniting means 50 may be manually operated or may operate automatically in accordance with the pressure within the chamber 40 in a manner similar to the arrangement shown in Fig. 2.

In operation of the embodiment disclosed in Figs. 4 and 5, fluid under high pressure, due to the forward motion of the wing, is applied through conduit 44 to the combustion chamber 40 wherein the fluid is mixed with the injection fuel to form a combustible mixture therein. The mixture is ignited by device 50 to produce a source of hot motor fluid. Due to the high pressures existing in the conduit 44 the hot motor fluid is discharged through nozzles 46 and 47 and the energy thereof is effective to apply forces to the wing in opposition to the direction of forward motion thereof. The dimensions of the openings 48, 49 and 50 and the capacities of the conduits leading therefrom to the combustion chamber 40 are selected in accordance with the operating speed of the wing so that adequate retarding forces may be continually maintained when desired.

Although the embodiments of the invention disclosed in Figs. 4 and 5 is shown as a single unit in one wing of an aircraft it is to be expressly understood that the arrangement may be duplicated in the opposite wing of the aircraft, and that a plurality of units may be employed in each wing. With such an arrangement, the fuel supplied to each unit may be selectively controlled, through a plurality of manually operable valves, such as valve 51 shown in Fig. 4, to providing means for directively controlling the aircraft during retardation periods. Such an arrangement is shown in Fig. 6, wherein fuel from supply conduit 52 is directed to the retardation units mounted in one wing of the aircraft through valve 51 and conduit 41 and to the retardation units mounted in the other wings through valve 53 and conduit 54. The valves 51 and 53 may be controlled remotely through operation of conventional electrical devices.

In all of the embodiments of the invention previously described it is contemplated to provide means for closing the inlet and exhaust openings in the airfoil section, such as openings 45, 48 and 49 shown in Figs. 4 and 5, in such a manner as to maintain a continuous normal contour of the airfoil section when the retarding means is not in operation, and with the closing means designed in such a manner as to withstand the high pressures involved when operating at extremely high velocities. A suitable form of closure means is shown in Fig. 7. This figure discloses a sectional view through the upper surface 37, including the opening 48, of Fig. 5, with the closure means in closed position. As shown, the opening 48 in the surface 37 is closed by a member 60 slidably mounted in the surface 37 by means of flanges 61, 61, extending from the member 60 into grooves 62, 62 provided in the surface 37. The lower portions of the surface 37 which define grooves 62, 62 are recessed from the opening 48 to provide exposed portions 63, 63 of flanges 61, 61. The exposed portions 63, 63 are provided with a plurality of equally spaced openings 64, 64 mounted in a plane parallel to the direction of sliding movement of the member 60. A pair of gear wheels 65, 65 are mounted by means of shaft 66 and bearings 67, 67 in operative engagement of opening 64, 64 for imparting relative sliding movement between the member 60 and the surface 37 in accordance with rotation applied to the shaft 66. This construction maintains the contour of the surface 37 substantially normal when the member 60 is moved to close the opening 48, and it is of sufficient strength to withstand the high pressures involved.

There has thus been provided by the present invention novel means for retarding the forward motion of an airfoil section while in flight. The devices provided herein are operable in connection with aircraft flying at any velocity but are particularly applicable in connection with airfoil sections designed to operate at extremely high velocities, within the supersonic range for example, to retard the forward motion of an airfoil section without the use of projected spoiler means. Furthermore, the novel devices may be installed in a nose portion of an aircraft fuselage, in nacelles or in the wings of an aircraft, and when utilized in the latter manner, means are provided for selectively controlling the retardation forces generated in each wing section to provide a system for controlling the direction of flight of the aircraft during the retardation period.

Although several embodiments of the invention have been disclosed and described herein it is to be expressly understood that various changes and substitutions may be made without departing from the spirit of the invention as well understood by those skilled in the art, reference, therefore, will be had to the appended claim for a definition of the limits of the invention.

The invention described herein may be manufactured and used by or for the Government of the United States of America for governmental purposes without the payment of any royalties thereon or therefor.

What is claimed is:

In a forward section of the sustaining airfoil of a propellerless airplane, an air intake opening in the leading edge of said airfoil, forwardly facing discharge nozzles disposed in the leading edge of said airfoil above and below said air intake opening, a combustion chamber, conduits connecting said air intake opening and said discharge nozzles to said combustion chamber, said air intake opening supplying air under pressure to said combustion chamber in response to the forward motion of the aircraft, said discharge nozzles emitting the products of combustion formed in said combustion chamber, and a plurality of slidably mounted members mounted in said airfoil section to close said discharge nozzles to form a continuous normal contour of said airfoil section when said discharge nozzles are not in use.

JAMES A. McNALLY.

REFERENCES CITED

The following references are of record in the file of this patent:

UNITED STATES PATENTS

| Number | Name | Date |
|---|---|---|
| 1,069,694 | Hayot | Aug. 12, 1913 |
| 1,611,353 | Lepinte | Dec. 21, 1926 |
| 1,854,043 | Korner | Apr. 12, 1932 |
| 2,081,151 | Myers | May 25, 1937 |
| 2,142,601 | Bleecker | Jan. 3, 1939 |
| 2,280,835 | Lysholm | Apr. 28, 1942 |
| 2,382,016 | Love | Apr. 14, 1945 |
| 2,395,435 | Thompson et al. | Feb. 26, 1946 |
| 2,422,744 | O'Neil | June 24, 1947 |
| 2,451,008 | Williams | Oct. 12, 1948 |
| 2,465,457 | Johnston | Mar. 29, 1949 |
| 2,523,378 | Kollsman | Sept. 26, 1950 |
| 2,527,732 | Imbert | Oct. 31, 1950 |

FOREIGN PATENTS

| Number | Country | Date |
|---|---|---|
| 403,730 | France | Oct. 2, 1909 |

OTHER REFERENCES

Ser. No. 367,666, Anxionnaz (A. P. C.), published May 23, 1943.